US012063468B2

(12) United States Patent
Sato et al.

(10) Patent No.: US 12,063,468 B2
(45) Date of Patent: Aug. 13, 2024

(54) SPEAKER UNIT AND SPEAKER

(71) Applicant: SOUND FUN CORPORATION, Tokyo (JP)

(72) Inventors: Kazunori Sato, Tokyo (JP); Nobuhiro Miyahara, Tokyo (JP); Yoshio Sakamoto, Tokyo (JP); Hiroshi Tanaka, Tokyo (JP)

(73) Assignee: SOUND FUN CORPORATION, Tokyo (JP)

( * ) Notice: Subject to any disclaimer, the term of this patent is extended or adjusted under 35 U.S.C. 154(b) by 253 days.

(21) Appl. No.: 17/635,793

(22) PCT Filed: Aug. 17, 2019

(86) PCT No.: PCT/JP2019/032203

§ 371 (c)(1),
(2) Date: Feb. 16, 2022

(87) PCT Pub. No.: WO2021/033226

PCT Pub. Date: Feb. 25, 2021

(65) Prior Publication Data

US 2022/0295173 A1 Sep. 15, 2022

(51) Int. Cl.
*H04R 7/02* (2006.01)
*H04R 1/02* (2006.01)
(Continued)

(52) U.S. Cl.
CPC ............... *H04R 1/24* (2013.01); *H04R 1/025* (2013.01); *H04R 7/12* (2013.01); *H04R 9/027* (2013.01)

(58) Field of Classification Search
CPC ....... H04R 7/04; H04R 7/18; H04R 2207/021
See application file for complete search history.

(56) References Cited

U.S. PATENT DOCUMENTS 5,602,930 A * 2/1997 Walton .................... H04R 1/24 381/186
9,967,675 B2 * 5/2018 Calmel ................. H04R 9/043
(Continued)

FOREIGN PATENT DOCUMENTS

JP 5668233 B1 2/2015
JP 2015-188195 A 10/2015
(Continued)

*Primary Examiner* — Ryan Robinson
(74) *Attorney, Agent, or Firm* — Dilworth & Barrese, LLP

(57) ABSTRACT

[Problem] The present invention is directed to a higher-performance and higher-quality curved diaphragm speaker system without deficiency of performance for both a hearing-impaired person and a normal hearing person.
[Solution] A speaker unit 10 according to the present invention includes at least a first diaphragm 1 having a corn shape, a second diaphragm 2 having a curved sheet shape, and a driver unit 3 that drives both the first diaphragm and the second diaphragm. A small diameter side 1*a* of the first diaphragm and one end side 2*a* of the second diaphragm are coupled to the driver unit. When the speaker unit is mounted in a housing 50 to be a speaker 100, a large diameter side 1*b* of the first diaphragm is coupled to a support plate 511 of a support member 51 that is a part of the housing, and the other end side 2*b* of the second diaphragm is coupled to a support leg 513 of the support member that is a part of the housing.

20 Claims, 12 Drawing Sheets

(51) Int. Cl.

| | |
|---|---|
| ***H04R 1/24*** | (2006.01) |
| ***H04R 7/12*** | (2006.01) |
| ***H04R 9/02*** | (2006.01) |

(56) References Cited

U.S. PATENT DOCUMENTS

| | | | | |
|---|---|---|---|---|
| 10,034,094 | B2 * | 7/2018 | Perkins .................... | H04R 9/04 |
| 10,182,294 | B2 * | 1/2019 | Nozaki .................... | H04R 7/16 |
| 10,327,075 | B2 * | 6/2019 | Fujitani ................ | H04R 31/003 |
| 2015/0110305 | A1 * | 4/2015 | Noro ........................ | H04R 7/20<br>381/162 |
| 2016/0353206 | A1 | 12/2016 | Stahl et al. | |
| 2023/0345179 | A1 * | 10/2023 | Kawashima ............. | H04R 1/24 |

FOREIGN PATENT DOCUMENTS

| | | | |
|---|---|---|---|
| JP | 2015-233272 | A | 12/2015 |
| JP | 2016-140060 | A | 8/2016 |

* cited by examiner

SPEAKER UNIT AND SPEAKER

TECHNICAL FIELD

The present invention relates to a speaker using a curved diaphragm and a speaker unit, and specifically, relates to a higher-performance compound type curved diaphragm speaker system that allows hard-of-hearing people to hear together with hearing people without using a hearing aid and that also expands a reproduction frequency band.

BACKGROUND ART

Recent years, the number of people with heating difficulties such as age-related hearing loss caused by aging, organic hearing loss with a damage to the external ear, the middle ear, the internal ear, the cochlear nerve, and the like, and functional hearing loss caused by stress has been increased, and the number of hard-of-hearing people in the country (Japan) is said to be 20 million. In a case of hearing loss, it is not only a loss of a sense of hearing but also it is difficult to distinguish clearly even the sounds that can hear. For this reason, in some cases, misunderstanding may give to a conversation partner by answering even without understanding the content of the conversation well, or a lively conversation cannot be made because of repeatedly asking of what is said.

Additionally, it has been said that there is a risk that an inability to communicate smoothly due to the hearing loss may cause a phenomenon where it becomes troublesome unconsciously to have a conversation, which leads less opportunities to meet with people and a tendency to stay at home, and there may occur a problem of social isolation and exclusion.

In general, use of a hearing aid is a means of reducing the inconveniences of the hearing loss as described above. Additionally, for a case of watching a television, there is an FM transmitter that obtains the sound of the television by being connected to an earphone jack of the television to transmit the sound via FM radio waves and receive the FM radio waves with the own FM radio.

However, the hearing aid has not been preferably used and has been used reluctantly in many cases because of the reasons such as "troublesome" and "embarrassing to wear". Additionally, there are many hearing aids that also pick up the noises, which rather causes great stress in some cases.

On the other hand, in a case of using the FM transmitter, it is troublesome there is required to prepare the FM transmitter and install the FM transmitter every time watching a television. Additionally, there is a problem that, since the output destination of the sound is switched by connecting the FM transmitter to the earphone jack, it is impossible for hard-of-hearing people and hearing people to comfortably watch the television together.

To deal with this, as a speaker that generates sound that hard-of-hearing people can almost hear, there has been proposed by the applicant a speaker that is provided with a housing with a hollow structure, a driving unit stored in the housing, and a curved diaphragm arranged on a surface of the housing so as to emit the sound by conducting vibrations of the driving unit to an end edge (surface) portion of the curved diaphragm (for example, see Patent Documents 1 and 2).

Such a speaker using a curved diaphragm (hereinafter, simply referred to as a "curved diaphragm speaker") allows hard-of-hearing people to hear without wearing a hearing aid and also allows hearing people to hear without any discomfort.

In addition, with the curved diaphragm speaker according to the inventions disclosed in Patent Documents 1 and 2, it could be confirmed in a later demonstration experiment that it allows for hearing of close sounds as a matter of course but also for clear heating of sounds in the distance. That is, it allows for hearing with no cracking sound like when the volume is turned up excessively and also for hearing of close sounds at a volume not excessively loud.

It has been confirmed that this curved diaphragm speaker has a basic performance at an applicable level and is at a manufacturable level; however, it has been demanded to expand a reproduction frequency band, in particular, to enhance the sound quality by improving the reproduction performance in a low sound band equal to or less than 400 to 500 Hz (hereinafter, referred to as a "low frequency").

Here, the curved diaphragm speaker is in general a means that drives a curved diaphragm by a moving coil, that is, a voice coil, and generates sound. In order to increase the reproduction capability on the low frequency side in this means, there is required an increase in the amount of voice coil amplitude (movement) appropriate for the capability, an appropriate diaphragm and structure, and powerup.

However, if the amount of the amplitude of the voice coil is increased forcibly to increase the reproduction capability on the low frequency side, the curved diaphragm itself makes abnormal sound. For this reason, in order to perform the low frequency reproduction equivalent to that by a conventional type speaker, the area of the curved diaphragm needs to be expanded by, for example, extending the length, but the dimension is no longer an applicative dimension.

To deal with this, it can be considered in order to increase the reproduction capability on the low frequency side that a dynamic type speaker unit including a cone shaped diaphragm is further mounted in a housing in which a curved diaphragm speaker unit is mounted, and both the speaker units are driven to emit sounds respectively. With this, the sound quality of the curved diaphragm with which it is difficult to sound on the low frequency side by the sound emission can be corrected by the cone shaped diaphragm, and there can be implemented a compound type full-range speaker using the curved diaphragm and the cone shaped diaphragm.

However, in such a compound type speaker system, although the housing in which the speaker units are mounted can be shared, there are still required the two speaker units (the curved diaphragm speaker unit and the dynamic type speaker unit) corresponding to the reproduction frequency bands, and this leads high cost.

Additionally, if each of the speaker units are mounted in the housing to make the sound emission directions of the curved diaphragm and the cone shaped diaphragm the same in order to secure a favorable sense of sound pressure of the sound emitted from the two speakers, a greater disposing area is required, and the size of the housing is increased. On the other hand, if the sound emission directions of the curved diaphragm and the cone shaped diaphragm are made different in consideration of the disposing area, it is impossible to obtain a sufficient sense of sound pressure in either of the speakers.

PRIOR ART DOCUMENTS

Patent Documents

Patent Documents 1: Japanese Patent No. 5668233
Patent Documents 2: Japanese Patent Application Publication No. 2016-140060

SUMMARY OF INVENTION

Technical Problems

The present invention is made in view of the above circumstances and provides a speaker for a compound type speaker system using a curved diaphragm, in which: the sound quality is enhanced by an expansion of a reproduction frequency band; the cost is reduced as well; and additionally, a favorable sense of sound pressure is secured with no increase in size of a housing.

Solution to Problems

A first speaker unit according to the present invention at least includes: a first diaphragm in a cone shape; a second diaphragm in a sheet shape that includes a single rounded surface portion that is curved; and a driver unit that drives the first diaphragm and the second diaphragm together. Here, the driver unit is connected to a small diameter side of the first diaphragm and one end side of the second diaphragm.

A second speaker unit according the present invention at least includes: a first diaphragm in a cone shape; a second diaphragm in a curved sheet shape; a driver unit that drives the first diaphragm and the second diaphragm together; and a support member on which the first diaphragm, the second diaphragm, and the driver unit are mounted. Here, the support member includes a support plate in a flat plate shape, a protrusion portion that protrudes from one surface of the support plate, and a support leg in a wide-width cave shape that is provided on the protrusion portion, a small diameter side of the first diaphragm and one end side of the second diaphragm are connected to the driver unit, a large diameter side of the first diaphragm is connected to the support plate of the support member, and the other end side of the second diaphragm is connected to the support leg of the support member.

In the speaker unit of the present invention, a connection structure of the second diaphragm to the driver unit is not particularly limited. Therefore, the one end side of the second diaphragm is attached directly or indirectly to the driver unit.

Specifically, the second diaphragm may be connected by inserting the one end side into a notch provided in a tip end of a coil bobbin of the driver unit.

Additionally, in the second diaphragm, the one end side may be connected to a center cap (also referred to as a "dust cap" or a "chamber"), which is attached on the tip end of the coil bobbin of the driver unit, or to a sub cone. In this case, the second diaphragm may be connected by inserting the one end side to pass through a notch provided in the center of the center cap.

Moreover, in the speaker unit of the present invention, the second diaphragm may be attached to the driver unit with a reinforcing plate attached on one surface on the one end side.

Furthermore, in the speaker unit of the present invention, in the second diaphragm, the one end side may be further connected to a surface of the first diaphragm via a side edge portion of the reinforcing plate.

Additionally, in the speaker unit of the present invention, the second diaphragm can include a constricted portion or a notch portion. The constricted portion is a side edge portion of the second diaphragm that partially includes a narrow-width region, and the notch portion is a surface of the second diaphragm that partially includes a notched opening region.

A speaker according one aspect of the present invention at least includes: a first diaphragm in a cone shape; a second diaphragm in a curved sheet shape; a driver unit that drives the first diaphragm and the second diaphragm together; and a housing that stores the first diaphragm, the second diaphragm, and the driver unit. Here, the housing includes a support member on which the first diaphragm, the second diaphragm, and the driver unit are mounted, the support member includes a support plate in a flat plate shape, a protrusion portion that protrudes from one surface of the support plate, and a support leg in a wide-width eave shape that is provided on the protrusion portion, a small diameter side of the first diaphragm and one end side of the second diaphragm are connected to the driver unit, a large diameter side of the first diaphragm is connected to the support plate of the support member forming a part of the housing, and the other end side of the second diaphragm is connected to the support leg of the support member forming a part of the housing.

In the support member, the protrusion portion can be provided in a vertical direction in a width direction-center portion of a front plate, and additionally, in the protrusion portion, a protruding front surface is favorable to be in an arc shape equal to the curve of the second diaphragm, and moreover, the protrusion portion is desired to include a clearance on a back surface that is not put in contact with the large diameter side of the first diaphragm.

Additionally, in the speaker according to the present invention, the housing can be a hollow structure in a box shape including six surfaces, which are a front plate, a back plate, a right side plate, a left side plate, a top plate, and a bottom plate, and in this case, the support plate of the support member can also function as the front plate of the housing, that is, the front plate of the housing can be the support plate of the support member.

Moreover, in the speaker according to the present invention, the housing is desired to be a skeleton structure in which a frontward region of the front plate includes an open portion formed by a frame body.

Advantageous Effects of Invention

In the speaker unit of the present invention, with the small diameter side of the first diaphragm and the one end side of the second diaphragm connected to the same driver unit, the driver unit that drives the first diaphragm and the driver unit that drives the second diaphragm are common. Therefore, since there is required only one driver unit, the manufacturing cost and the weight are reduced, and also the speaker unit is manufactured small in a compact form.

Additionally, in the speaker of the present invention, the above-described speaker unit of the present invention is stored in the housing, the large diameter side of the first diaphragm is connected to the support plate of the support member forming a part of the housing, and the other end side of the second diaphragm is connected to the support leg of the support member forming a part of the housing. Therefore, there is obtained a hybrid type speaker system in which the dynamic type first speaker including the cone shaped diaphragm and the second speaker including the curved diaphragm are combined with each other, and with the first speaker (the dynamic type speaker) making up for a reproduction band on the low frequency side that the second speaker (the curved diaphragm speaker) cannot sound, it is possible to reproduce the sound of a wider band and to obtain a speaker system including a speaker that is quite effective for hard-of-hearing people and a speaker that is for hearing people.

In addition, with the first speaker and the second speaker integrally provided in a coupled manner via the single driver unit, a disposing area is less, and additionally, it is possible to obtain a higher performance and higher quality hybrid type speaker system with which the sound from the first speaker and the sound from the second speaker are mixed, and both the hard-of-hearing people and hearing people can hear.

Therefore, it is possible to provide a speaker for a compound type speaker system using a curved diaphragm, in which: the sound quality is enhanced by an expansion of a reproduction frequency band; the cost and the weight are reduced by using and sharing only one driver unit; and additionally, a favorable sense of sound pressure is secured with no increase in size of a housing.

DESCRIPTION OF EMBODIMENT

Hereinafter, a speaker unit according to the present invention and an example of an embodiment of a hybrid type speaker system using this speaker unit is described with reference to the drawings.

Since the embodiment described below is a preferable specific example of the present invention, there are included various technical limitations; however, the scope of the present invention is not limited to those modes unless the limitation is stated otherwise in the descriptions below.

Figure 1:
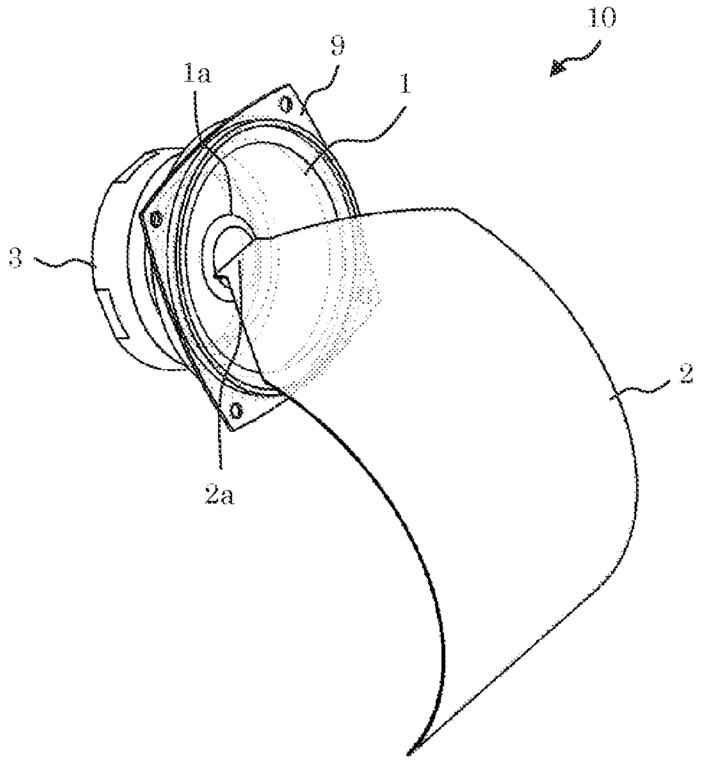
FIG. 1 is a front perspective view illustrating a first speaker unit according to the present invention.
Figure 2:
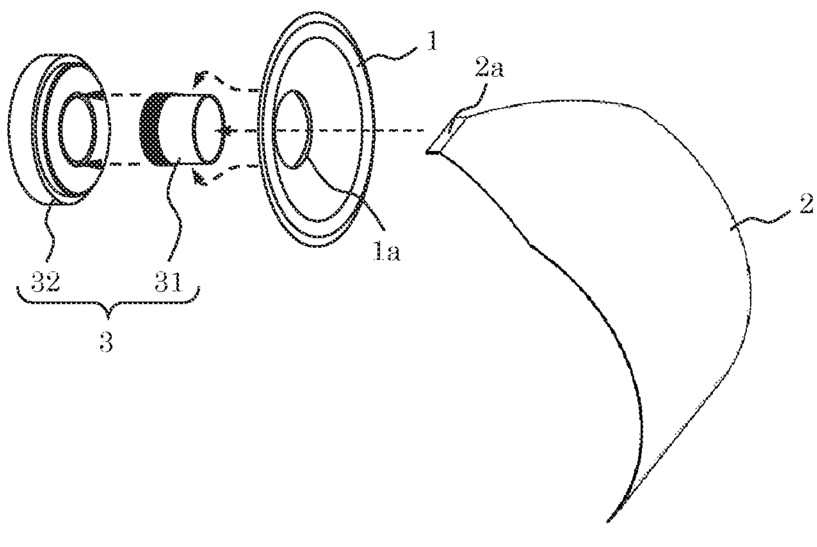
FIG. 2 is an exploded view describing a basic structure of the first speaker unit according to the present invention.

As illustrated in FIG. 1 and FIG. 2, a speaker unit 10 according to the present embodiment at least includes a first diaphragm in a cone shape (hereinafter, referred to as a "cone shaped diaphragm") 1, a second diaphragm in a curved sheet shape (hereinafter, referred to as a "curved diaphragm") 2, and a driver unit 3 that drives those cone shaped diaphragm 1 and curved diaphragm 2 together.

The cone shaped diaphragm 1 is a sheet shaped member (a member composed of a sheet) in a mortar shape, in which a small diameter side 1*a* is connected to the driver unit 3 while a large diameter side 1*b* is attached to a cone support frame 9. When a speaker is formed, this cone shaped diaphragm 1 attaches the cone support frame 9 to a housing 50 described later, and the large diameter side 1*b* of the cone shaped diaphragm 1 is connected to the housing 50 via the cone support frame 9.

The curved diaphragm 2 is a sheet shaped member having flexibility of being able to form a rounded surface portion that is curved, in which one end side 2*a* is connected to the driver unit 3 that is the same one to which the small diameter side 1*a* of the cone shaped diaphragm 1 is connected. After the one end side 2*a* is connected to the driver unit 3 in an upright flat plate state, this curved diaphragm 2 forms a rounded surface by elastically bending and deforming the other end side 2*b* and directs the deformed curved protruding surface side frontward to connect the other end side 2*b* to the housing 50 described later. Additionally, the curved diaphragm 2 may be a member that is formed to include in advance a rounded surface portion that is curved; in this case, after the one end side 2*a* is connected to the driver unit 3, the other end side 2*b* is connected to the housing 50 described later such that the curved protruding surface directs frontward.

Moreover, the curved diaphragm 2 has a shape in which a distance (width) between side edge portions along a direction from the one end side 1*a* toward the other end side 1*b* is gradually decreased from the middle of the way from the other end side 2*b* to the one end side 2*a*. That is, the shape of the side edge portion close to the one end side 2*a* in the curved diaphragm 2 has a shape substantially the same as and conforming with the mortar shape of the cone shaped diaphragm 1 such that the cone shaped diaphragm 1 and the curved diaphragm 2 do not interfere with each other when the one end side 2*a* of the curved diaphragm 2 is connected to the driver unit 3 to which the cone shaped diaphragm 1 is connected.

Furthermore, although it is not illustrated, the curved diaphragm 2 may include a constricted portion in the side edge portion or a notch portion in a surface.

The constricted portion includes partially a narrow-width region with the side edge portion of the curved diaphragm 2 being notched curvilinearly and smoothly and can have a guitar shape or a snowman shape when the curved diaphragm 2 is viewed from the front, for example.

Additionally, the notch portion includes partially an opening region with the surface being notched to form a single or multiple holes near the center of the curved diaphragm 2, and there can be formed one large circular hole or a pattern with small holes, for example.

With such constricted portion and notch portion provided in the curved diaphragm 2, it is possible to restrict distortion due to resonance of the curved diaphragm 2 and to achieve the enhancement of hearing with appropriate harmonics by suppressing excessive resonance.

As a material of this curved diaphragm 2, paper such as carbon paper, plastic having flexibility such as polyimide and polyester, wood such as balsa wood, and metal such as aluminum, beryllium, and boron can be used. Additionally, the thickness of the curved diaphragm 2 is not particularly limited as long as the curved diaphragm 2 can be formed so as to include in advance the rounded surface portion that is curved, or the curved diaphragm 2 can be elastically bent and deformed.

The driver unit 3 is an actuator that vibrates the cone shaped diaphragm 1 and the curved diaphragm 2 together in accordance with an electric signal (a sound signal) inputted (electrically conducted).

The driver unit 3 may include an electromagnetic actuator of a moving coil type or a moving magnet type, for example. These driver units 3 have a high magnetic efficiency since the coil has a high occupancy. Therefore, clear sound emission with high volume can be expected.

The moving coil type actuator, in which a voice coil is inserted and arranged in a magnetic gap formed by the magnetic circuit, transmits vibrations and drives a diaphragm connected with the voice coil by applying an electric signal and the like to this voice coil and generating vibrations according to the applied signal. That is, one end of the voice coil is stored within the magnetic circuit (a magnetic field), and the other end is connected to the diaphragm; thus, the inputted electric signal moves the voice coil, and the movement is transmitted to the diaphragm and converted into sound energy (sound).

In the present embodiment, the driver unit 3 is described as a moving coil type actuator that drives a voice coil 31 by applying an electric signal with one end of the voice coil 31 inserted into a magnetic gap of a magnetic circuit 32.

Figure 3:
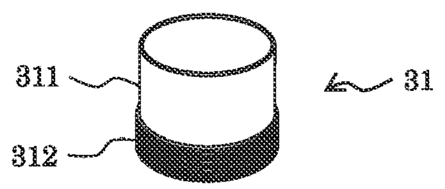
FIG. 3 is a front perspective view describing a voice coil included in a driver unit used in a speaker unit according to the present invention.

As illustrated in FIG. 3, the voice coil 31 is formed by winding a coil wire rod 312 of a desired diameter by the desired number of turns around an outer periphery end portion of a coil bobbin 311 in a cylindrical shape.

Figure 4A:
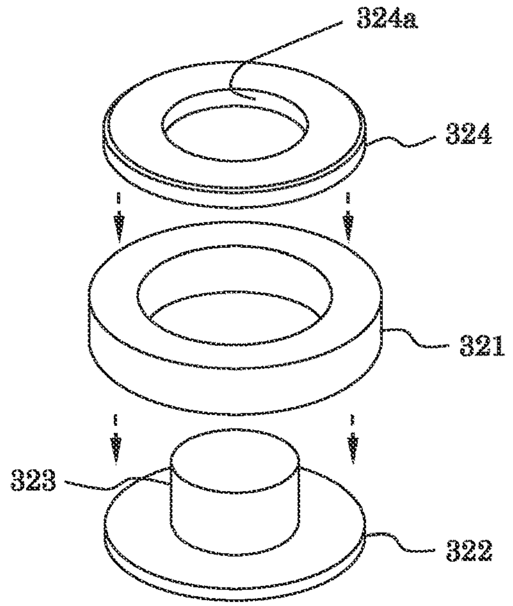
FIG. 4(A) is an exploded perspective view and FIG. 4(B) is an assembled completion perspective view describing a magnetic circuit included in the driver unit used in the speaker unit according to the present invention.
Figure 4B:
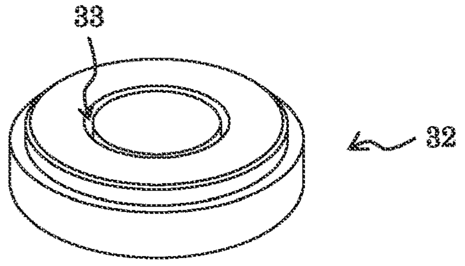

On the other hand, as illustrated in FIG. 4, the magnetic circuit 32 has a shape appropriate for driving the voice coil 31, and a common structure most frequently used includes magnetic circuit parts such as a ferrite magnet 321 in a ring shape, a plate 324 in which a hole 324*a* with a diameter of a predetermined dimension is provided in a center portion of a circle plate made of iron material that is an excellent magnetic material, and a yoke 322 in which a protrusion portion (hereinafter, described as a "pole") 323 in a column shape is provided similarly in a center portion of a circle plate made of iron material.

The magnetic gap is formed with the plate 324 arranged and mounted on an upper surface of the ferrite magnet 321 in a cylindrical shape and also with the circle plate portion of the yoke 322 including the pole 323 in a column shape arranged and mounted on a lower surface of the ferrite magnet 321. That is, the pole 323 and the plate 324 are mounted such that cores of an outer diameter of the pole 323 and an inner diameter of the plate hole 324*a* are aligned with each other, and thus a ring shaped clearance, or a gap 33, having a predetermined width dimension is formed between an outer surface of the pole 323 and an inner surface of the hole 324*a* in the plate 324 center portion.

Additionally, the dimension in a depth direction of the gap 33 is determined based on the thickness dimension of the plate 324. Therefore, magnetism that the ferrite magnet 321 has is conducted and converged into the gap 33 by the yoke 322 and the plate 324, a magnetic flux is generated in the gap 33, and thus the magnetic gap is formed. Then, the voice coil 31 is arranged in the center of this ring shaped magnetic gap 33.

Therefore, as illustrated in FIG. 2, the cone shaped diaphragm 1 is connected and fixed to the driver unit 3 by inserting the voice coil 31 into a hole (hereinafter, described as a "neck portion") 1*a* of a predetermined dimension provided in a center portion of the cone shaped diaphragm 1 and applying an adhesive to a contact portion between the neck portion 1*a* and an outer periphery portion of the coil bobbin 311.

On the other hand, as illustrated in FIG. 5 to FIG. 12, the curved diaphragm 2 can be connected and fixed to a tip end of the coil bobbin 311 by a predetermined means, for example.

Figure 5:
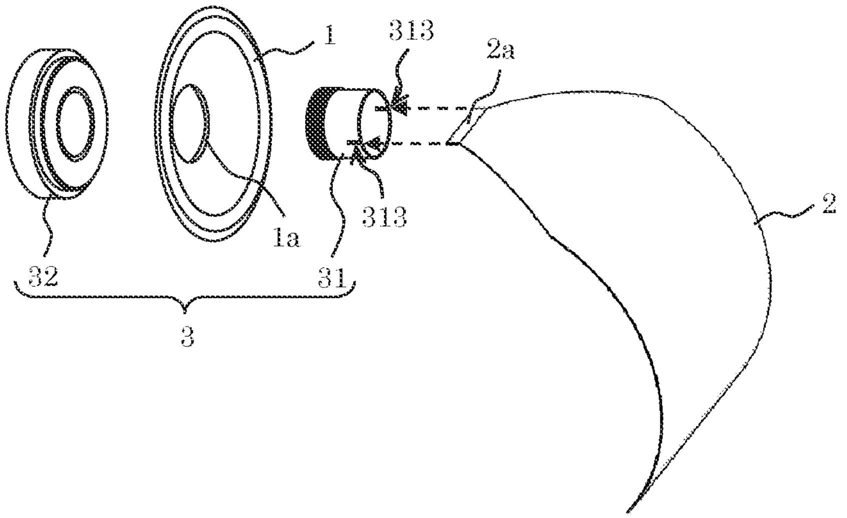
FIG. 5 is an exploded view describing a structure to attach a second diaphragm to the driver unit in the first speaker unit according to the present invention.

First, as illustrated in FIG. 5, it is possible to directly connect the curved diaphragm 2 and the driver unit 3 (the voice coil 31) with each other by providing a notch 313 in a tip end of the voice coil 31 and inserting the one end side 2*a* of the curved diaphragm 2 into the notch 313 to fix the curved diaphragm 2. In this process, it is desirable that the notch 313 is provided such that a one end side 2*a* end surface of the curved diaphragm 2 is put in contact with the voice coil 31 substantially at a right angle in order to efficiently transmit the vibrations from the driver unit 3 to the curved diaphragm 2.

In FIG. 5, there is illustrated a state where the curved diaphragm 2 is connected and fixed to the driver unit 3 by inserting the one end side 2*a* to which the adhesive is applied into two notches 313, 313 provided to be positioned on a horizontal straight line passing through the center of the voice coil 31 (the coil bobbin 311).

Figure 6:
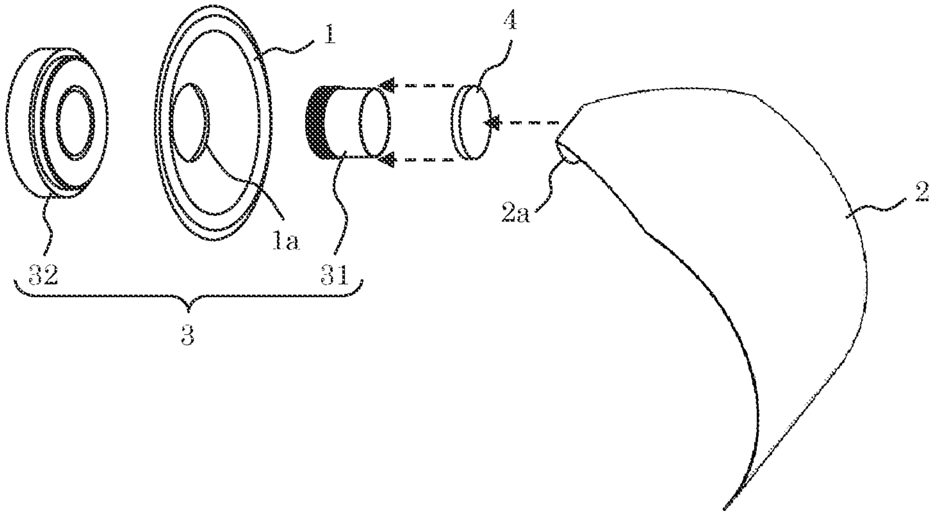
FIG. 6 is another exploded view describing a structure to attach a second diaphragm to the driver unit in the first speaker unit according to the present invention.

Additionally, as illustrated in FIG. 6, it is possible to directly connect the curved diaphragm 2 and the driver unit 3 (the voice coil 31) with each other by covering and fixing a center cap (a dust cap) 4 on the tip end of the voice coil 31 and fixing the curved diaphragm 2 to the center of this center cap 4. This means is desirable in that it is possible to connect more reliably the curved diaphragm 2 and the driver unit 3 (the voice coil 31) with each other than the above-described means where the notch 313 is provided in the tip end of the voice coil 31 and the one end side 2*a* of the curved diaphragm 2 is inserted.

This center cap (dust cap) 4 is a member attached to prevent dust from entering into the coil bobbin 311, and it is possible to enhance the sense of unity in the tone by using the same material as that of the cone paper, or it is possible to give a role of a dome type tweeter by using a metallic material.

In FIG. 6, there is illustrated a state where the curved diaphragm 2 is connected and fixed to the driver unit 3 by folding the one end side 2*a* downward to form a tab and pasting one surface (the tab) to which the adhesive is applied onto the surface of the center cap 4 covering the tip end of the voice coil 31 (the coil bobbin 311). In this process, it is desirable that the surface of the center cap 4 is flat, and the one end side 2*a* is folded and pasted such that the curved diaphragm 2 is put in contact with the tip end of the center cap 4 at substantially a right angle in order to efficiently transmit the vibrations from the driver unit 3 to the curved diaphragm 2.

Figure 7:
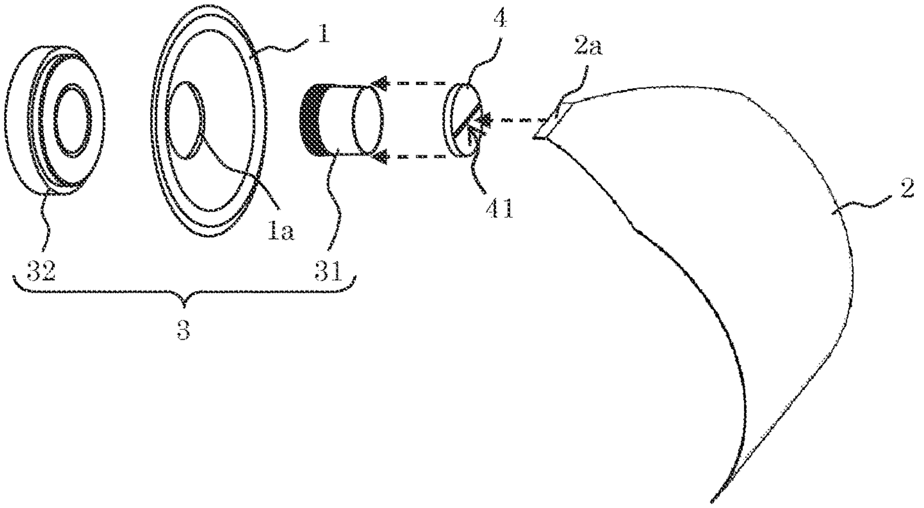
FIG. 7 is still another exploded view describing a structure to attach a second diaphragm to the driver unit in the first speaker unit according to the present invention.

Moreover, as illustrated in FIG. 7, it is possible to directly connect the curved diaphragm 2 and the driver unit 3 (the voice coil 31) with each other by providing a notch 41 in the center of the center cap (dust cap) 4 covering the tip end of the voice coil 31 and inserting the one end side 2*a* of the curved diaphragm 2 into this notch 41 to fix the curved diaphragm 2. This means is also desirable in that it is possible to connect more reliably the curved diaphragm 2 and the driver unit 3 (the voice coil 31) with each other than the above-described means where the notch 313 is provided in the tip end of the voice coil 31 and the one end side 2*a* of the curved diaphragm 2 is inserted.

In FIG. 7, there is illustrated a state where the curved diaphragm 2 is connected and fixed to the driver unit 3 by inserting the one end side 2*a* to which the adhesive is applied into the notch 41 provided to be positioned on the horizontal straight line passing through the center of the voice coil 31 (the coil bobbin 311). Note that, the one end side 2*a* of the curved diaphragm 2 may be folded back toward a back surface side of the center cap 4 after being inserted in the notch 41. With this, it is possible to reduce the risk that the one end side 2*a* of the curved diaphragm 2 is dropped out of the notch 41 as much as possible.

Figure 8:
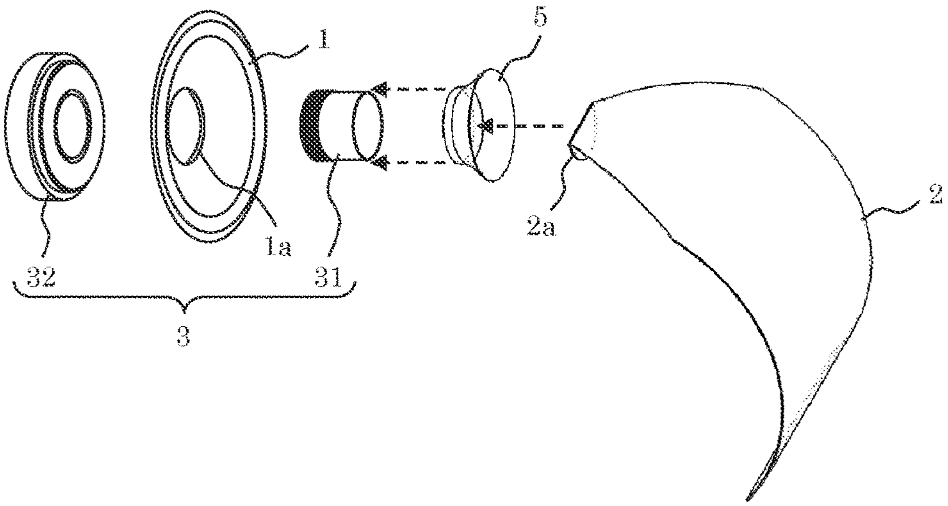
FIG. 8 is still another exploded view describing a structure to attach a second diaphragm to the driver unit in the first speaker unit according to the present invention.

Furthermore, as illustrated in FIG. 8, it is possible to directly connect the curved diaphragm 2 and the driver unit 3 (the voice coil 31) with each other by covering and fixing a sub cone 5 on the tip end of the voice coil 31 and fixing the curved diaphragm 2 to the center of this sub cone 5. This means is also desirable in that it is possible to connect more reliably the curved diaphragm 2 and the driver unit 3 (the voice coil 31) with each other than the above-described means where the notch 313 is provided in the tip end of the voice coil 31 and the one end side 2*a* of the curved diaphragm 2 is inserted.

Use of this sub cone 5 makes it possible to mount the curved diaphragm 2 easily and also to extend the high frequency emitted from the sub cone 5 itself that is directly attached on the tip end of the voice coil 31 (the coil bobbin 311) with the cone shaped diaphragm 1.

In FIG. 8, there is illustrated a state where the curved diaphragm 2 is connected and fixed to the driver unit 3 by folding the one end side 2*a* downward to form a tab and pasting one surface (the tab) to which the adhesive is applied onto a surface of the sub cone 5 covering the tip end of the voice coil 31 (the coil bobbin 311). In the curved diaphragm 2 in this process, as with the case of pasting to the surface of the center cap 4, it is desirable that the one end side 2*a* is folded and pasted such that the curved diaphragm 2 is put in contact with a tip end of the sub cone 5 at substantially a right angle in order to efficiently transmit the vibrations from the driver unit 3 to the curved diaphragm 2.

Furthermore, as illustrated in FIG. 9 to FIG. 11, the curved diaphragm 2 may be attached to the driver unit 3 by attaching reinforcing plates 21, 22, and 23 to one surface of the one end side 2*a*. With these reinforcing plates 21, 22, and 23 attached, it is possible to reduce the resonance of the curved diaphragm 2 and also to make the attachment of the curved diaphragm 2 to the voice coil 31 (such as the center cap 4 and the sub cone 5) easy and tight.

Figure 9A:
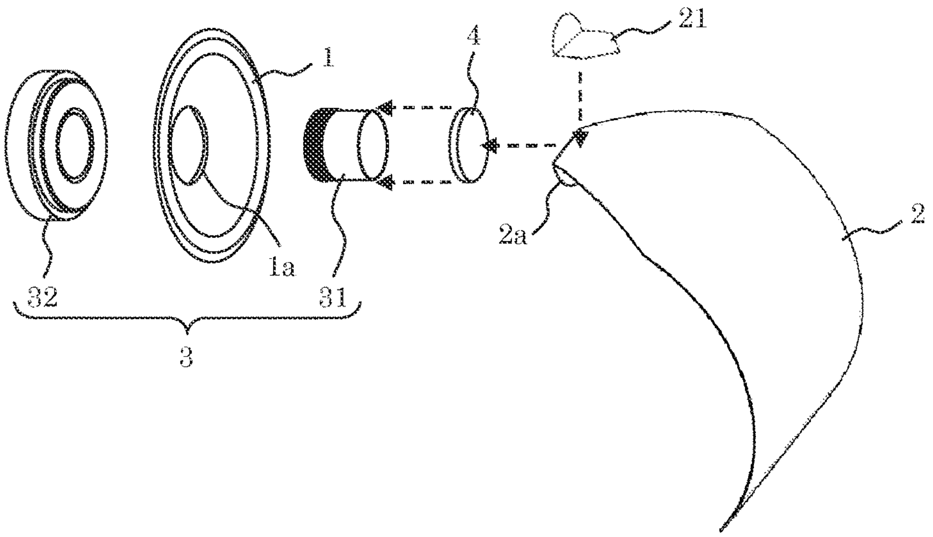
FIG. 9(A) is an exploded view and FIG. 9(B) is an assembled completion perspective view describing another structure to attach the second diaphragm to the driver unit in the first speaker unit according to the present invention.
Figure 9B:
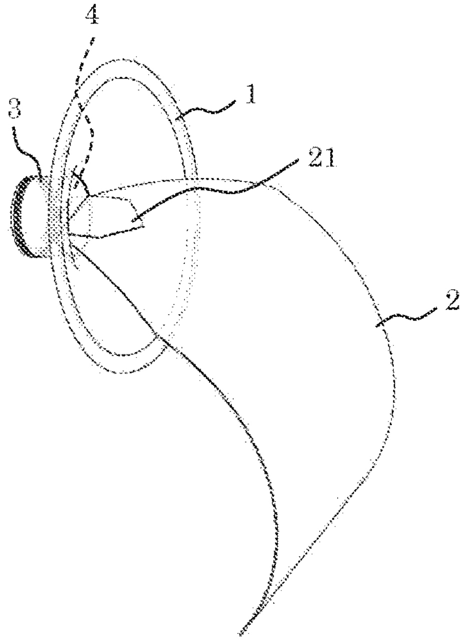

In FIG. 9(A), there is illustrated a state where, onto an upper surface in the one end side 2*a* of the curved diaphragm 2 in which the one end side 2*a* is folded downward, the reinforcing plate 21 in which one end side is folded upward similarly is pasted, and the adhesive is applied to one surface (a tab) formed by the folding so as to paste the one surface onto the surface of the center cap 4 covering the tip end of the voice coil 31 (the coil bobbin 311). Additionally, in FIG. 9(B), there is illustrated a state where the curved diaphragm 2 with the reinforcing plate 21 is connected and fixed to the driver unit. 3 by being pasted on the surface of the center cap 4 exposed in the center of the cone shaped diaphragm 1.

Figure 10A:
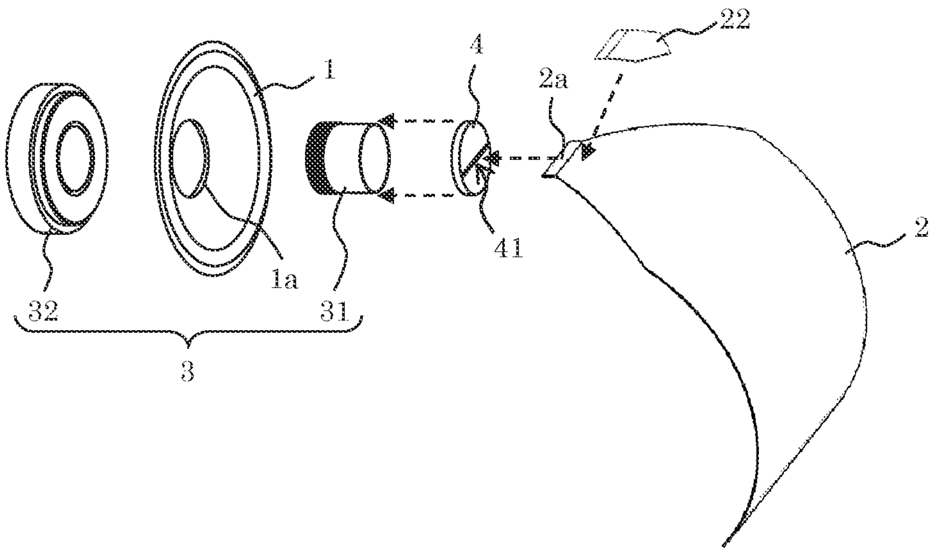
FIG. 10(A) is an exploded view and FIG. 10(B) is an assembled completion perspective view describing another structure to attach the second diaphragm to the driver unit in the first speaker unit according to the present invention.
Figure 10B:
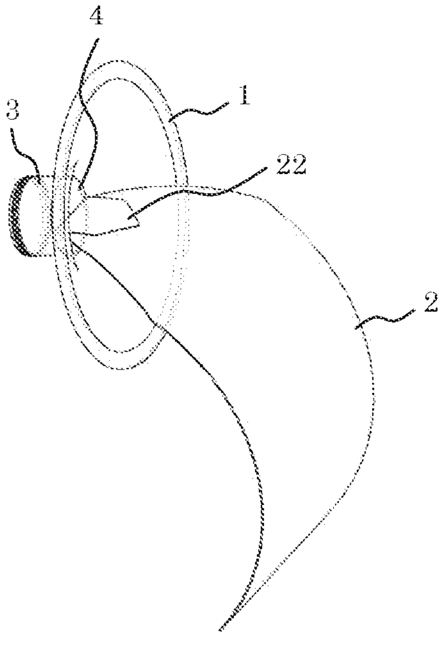

Moreover, in FIG. 10(A), there is illustrated a state where the reinforcing plate 21 is pasted onto the upper surface in the one end side 2*a* of the curved diaphragm 2, and the one end side 2*a* of the curved diaphragm 2 is inserted with the reinforcing plate 21 into the notch 41 provided in the center of the center cap 4. Furthermore, in FIG. 10(B), there is illustrated a state where the one end side 2*a* of the curved diaphragm 2 with the reinforcing plate 21 to which the adhesive is applied is connected and fixed to the driver unit 3 by being inserted to be pasted in the notch 41 of the center cap 4 exposed in the center of the cone shaped diaphragm 1.

Figure 11A:
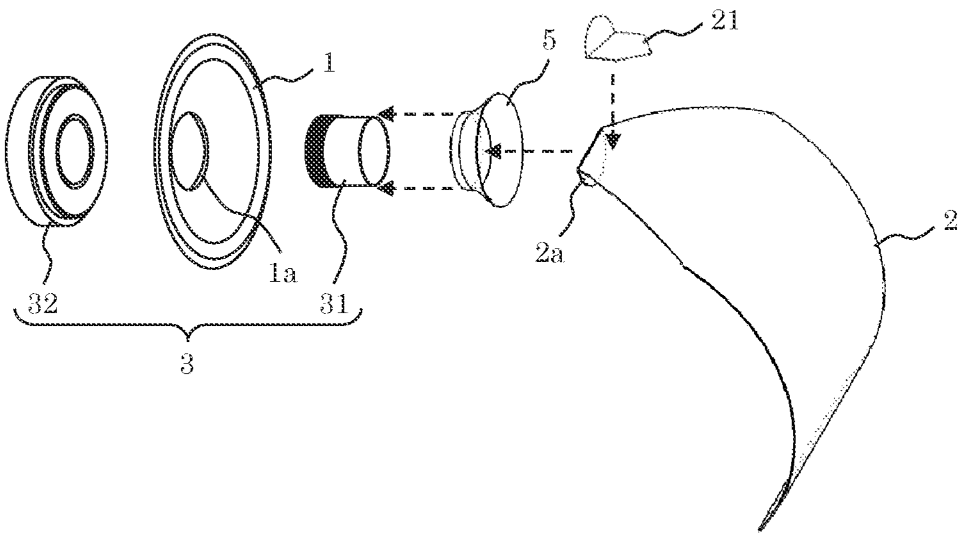
FIG. 11(A) is an exploded view and FIG. 11(B) is an assembled completion perspective view describing another structure to attach the second diaphragm to the driver unit in the first speaker unit according to the present invention.
Figure 11B:
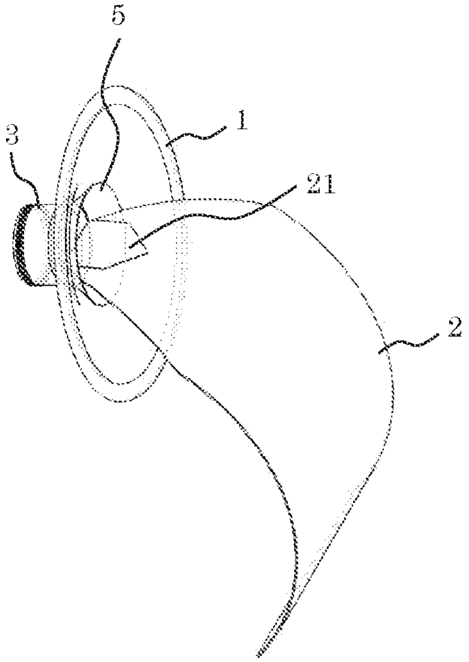

Additionally, in FIG. 11(A), there is illustrated a state where, onto the upper surface in the one end side 2*a* of the curved diaphragm 2 in which the one end side 2*a* is folded downward, the reinforcing plate 21 in which the one end side is folded upward similarly is pasted, and the adhesive is applied to one surface (a tab) formed by the folding so as to paste the one surface onto the surface of the sub cone 5 covering the tip end of the voice coil 31 (the coil bobbin 311). Moreover, in FIG. 11(B), there is illustrated a state where the curved diaphragm 2 with the reinforcing plate 21 is connected and fixed to the driver unit 3 by being pasted on the surface of the sub cone 5 exposed in the center of the cone shaped diaphragm 1.

Additionally, as illustrated in FIG. 12, the curved diaphragm 2 and the driver unit 3 (the voice coil 31) may be connected indirectly with each other by attaching a side edge portion 23*a* of the reinforcing plate 23 pasted on the one end side 2*a* of the curved diaphragm 2 onto the surface of the cone shaped diaphragm 1.

Figure 12A:
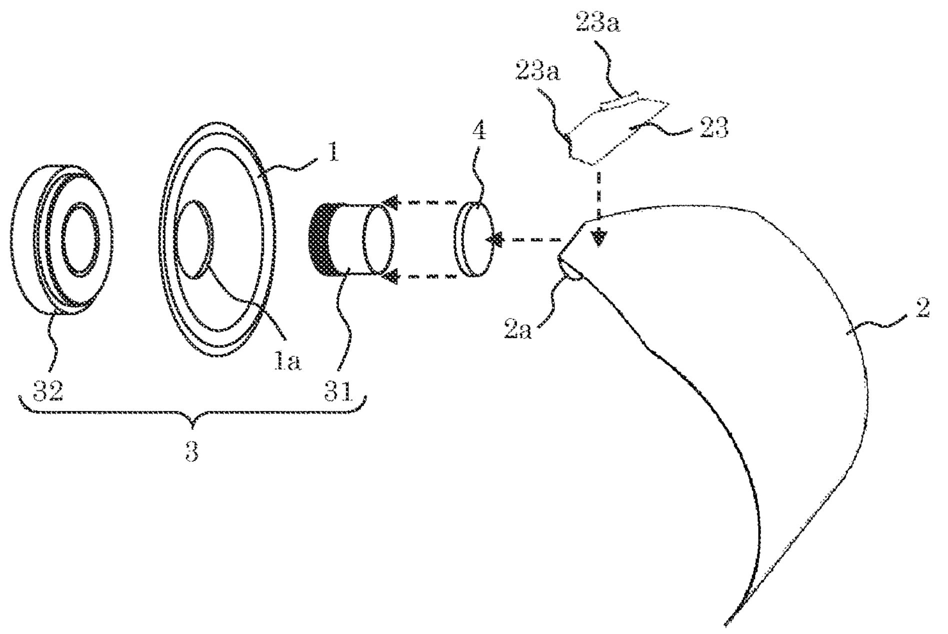
FIG. 12(A) is an exploded view and FIG. 12(B) is an assembled completion perspective view describing another structure to attach the second diaphragm to the driver unit in the first speaker unit according to the present invention.
Figure 12B:
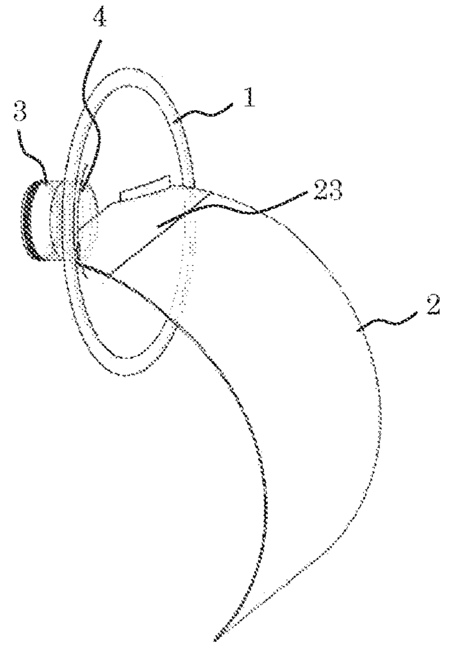

Additionally, in FIG. 12(A), there is illustrated a state where, onto the upper surface in the one end side 2*a* of the curved diaphragm 2 in which the one end side 2*a* is folded downward, the reinforcing plate 23 in which the side edge portion 23*a* is folded upward is pasted, and the adhesive is applied to one surface (a tab) formed by the folding and the end surface of the one end side 2*a*, so as to paste the one surface and the end surface onto the surface of the center cap 4 covering the tip end of the voice coil 31 (the coil bobbin 311) and the surface of the cone shaped diaphragm 1. Moreover, in FIG. 12(B), there is illustrated a state where the curved diaphragm 2 with the reinforcing plate 23 is connected and fixed to the driver unit 3 by being pasted on the surface of the center cap 4 exposed in the center of the cone shaped diaphragm 1 and the surface of the cone shaped diaphragm 1.

In the speaker unit 10 formed as described above, with the small diameter side 1*a* of the cone shaped diaphragm 1 and the one end side 2*a* end surface of the curved diaphragm 2 connected to the driver unit 3 (the voice coil 31) together, and with the electric signal and the like applied to the driver unit 3, the voice coil 31 generates the vibrations in accordance with the applied signal, and the vibrations are transmitted to the cone shaped diaphragm 1 and the curved diaphragm 2 connected with the voice coil to drive the cone shaped diaphragm 1 and the curved diaphragm 2 together.

That is, since the one end (a base end portion) of the voice coil 31 is within the magnetic circuit (the magnetic field) 32, and the other end (a tip end portion) is connected to the cone shaped diaphragm 1 and the curved diaphragm 2, the inputted electric signal moves the voice coil 31, and the movement is transmitted to the cone shaped diaphragm 1 and the curved diaphragm 2 and converted into sound energy (sound).

Here, a direction in which the curved diaphragm 2 is driven by the driver unit 3 is an expanding direction on the surface of the curved diaphragm 2, that is, a curved direction in which the rounded surface portion is expanded from the one end side 2*a* to the opposing other end side 2*h* (or from the other end side 2*b* to the opposing one end side 2*a*) in the curved diaphragm 2. This surface direction is curved in a bow shape when the curved diaphragm 2 is viewed from the side (cross section).

Figure 13:
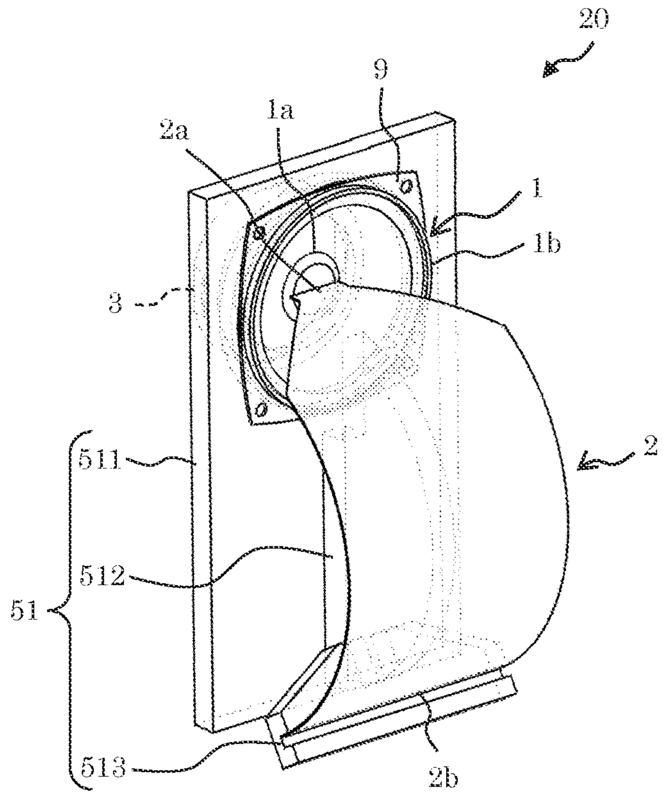
FIG. 13 is a front perspective view illustrating a second speaker unit according to the present invention.
Figure 14:
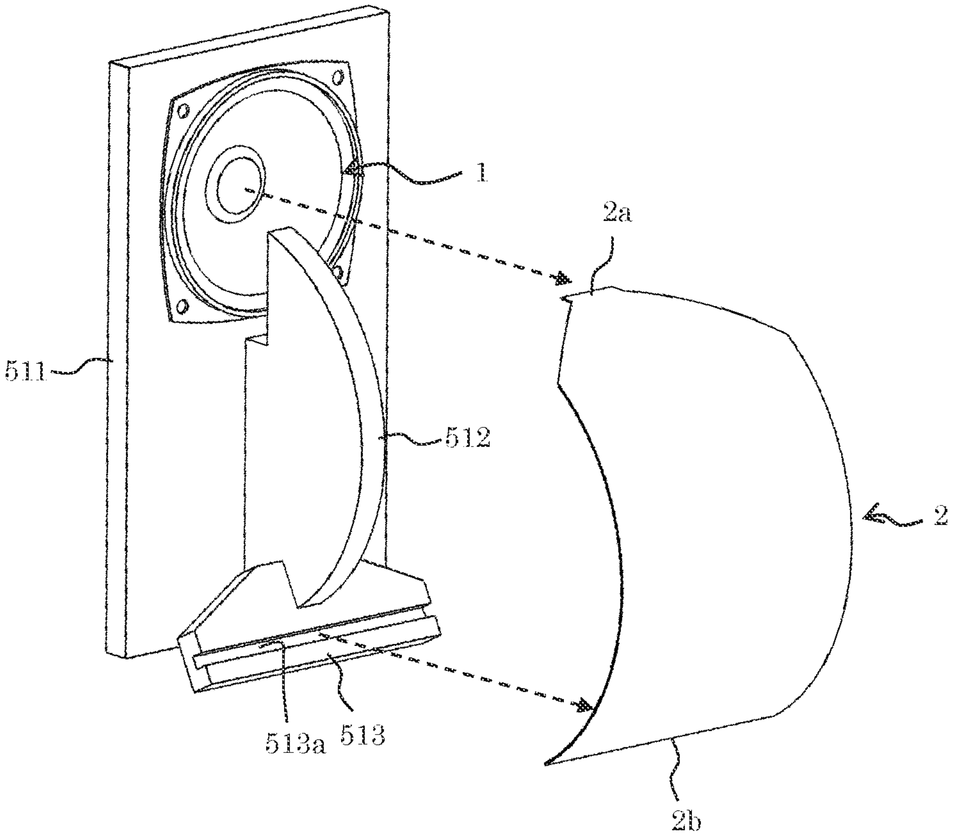
FIG. 14 is a front perspective view illustrating a state where the second diaphragm is detached in the speaker unit illustrated in FIG. 13.
Figure 15:
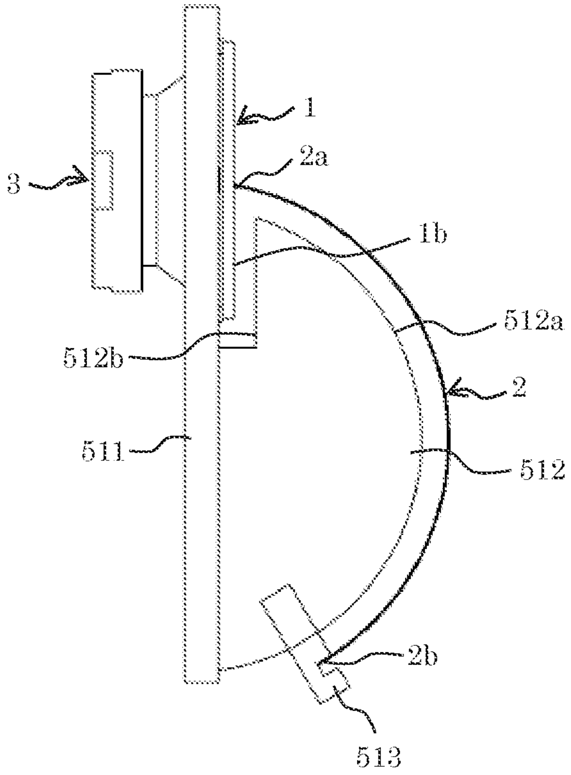
FIG. 15 is a side view illustrating the second speaker unit according to the present invention.

Additionally, as illustrated in FIG. 13 to FIG. 15, the speaker unit 10 can be a speaker unit 20 in a different mode by being mounted on a support member 51. That is, the small diameter side 1*a* of the cone shaped diaphragm 1 and the one end side 2*a* end surface of the curved diaphragm 2 are connected to the driver unit 3 (the voice coil 31), and the large diameter side 1*b* of the cone shaped diaphragm 1 and the other end side 2*b* of the curved diaphragm 2 are connected to the support member 51.

This support member 51 includes a support plate 511 in a flat plate shape, a protrusion portion 512 that protrudes from one surface of the support plate 511, and a support leg 513 in a wide-width cave shape that is provided on the protrusion portion 512.

The support plate 511 includes an opening (not illustrated) on an upper portion thereof through which the back surface side of the cone shaped diaphragm 1 can be inserted, and the large diameter side 1*b* of the cone shaped diaphragm 1 is connected to the support member 51 by the support plate 511 by attaching the cone support frame 9 to which the large diameter side 1*b* of the cone shaped diaphragm 1 is connected onto the periphery of the opening.

In the drawings, the support plate 511 has a vertically long rectangular shape; however, the shape is not particularly limited.

The protrusion portion 512 supports the support leg 513 to which the other end side 2*b* of the curved diaphragm 2 is attached, and a protruding front surface 512*a* is a rounded surface forming an arc substantially equal to the curve of the curved diaphragm 2 so as not to be an obstruction (not to touch) during the attaching of the curved diaphragm 2. Therefore, on a back surface side of the curved diaphragm 2, the front surface 512*a* of the protrusion portion 512 is positioned without being put in contact with a back surface of the curved diaphragm 2. This protrusion portion 512 functions as an auxiliary to prevent deformation of the curved diaphragm 2 due to external force from a front surface side.

Additionally, a back surface 512*b* of the protrusion portion 512 is not entirely attached on the support plate 511, and as illustrated in FIG. 15, a back surface 512*b* region positioned on a sound emission side of the cone shaped diaphragm 1 includes an appropriate clearance that is not put in contact with the large diameter side 1*b* of the cone shaped diaphragm 1, so as not to obstruct the vibrations of the cone shaped diaphragm 1.

Moreover, the only one protrusion portion 512 protrudes in an arc shape in a vertical direction in a front surface center portion of the support plate 511 such that the sound emission from the cone shaped diaphragm 1 is not insulated. With this, the sound generated from the cone shaped diaphragm 1 is emitted through two sides of the protrusion portion 512.

Note that, as long as the sound emission from the cone shaped diaphragm 1 is not insulated, multiple protrusion portions 512 may be provided.

The support leg 513 holds the other end side 2*b* of the attached curved diaphragm 2 and includes a depressed groove 513*a* on an upper surface along a width direction. With the other end side 2*b* of the curved diaphragm 2 attached in this depressed groove 513*a*, it is possible to connect the other end side 2*b* of the curved diaphragm 2 to the support member 51 by the support leg 513.

In the speaker unit 20 formed as described above, the small diameter side 1*a* of the cone shaped diaphragm 1 and the one end side 2*a* end surface of the curved diaphragm 2 are connected to the driver unit 3 (the voice coil 31), and the large diameter side 1*b* of the cone shaped diaphragm 1 and the other end side 2*b* of the curved diaphragm 2 are connected to the support member 51. Therefore, the cone shaped diaphragm 1, the curved diaphragm 2, and the driver unit 3 are stably supported by the support member 51, and easy conveyance and easy mounting in the housing can be made.

Figure 16:
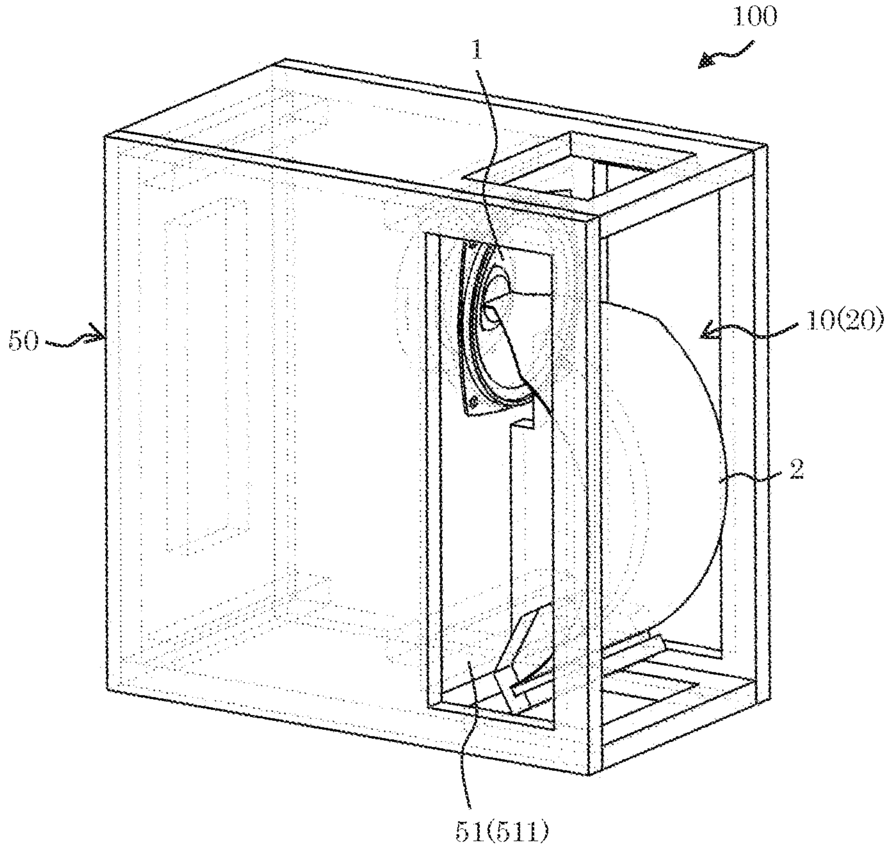
FIG. 16 is a front perspective view illustrating a speaker according to the present invention.

Additionally, as illustrated in FIG. 16, a speaker 100 according to the present embodiment is configured by at least including the cone shaped diaphragm 1, the curved diaphragm 2, the driver unit 3, and the housing 50, and with a dynamic type first speaker including the cone shaped diaphragm 1 and a second speaker including the curved diaphragm 2 included, both the hard-of-hearing people and hearing people can hear.

The housing 50 is a hollow structure in a box shape storing the cone shaped diaphragm 1, the curved diaphragm 2, and the driver unit 3 and is a skeleton structure in which a frontward region from which the mounted first speaker (the cone shaped diaphragm 1) and second speaker (the curved diaphragm 2) emits sound includes an open portion formed by a frame body.

When the above-described first speaker unit 10 is mounted in the housing 50, for example, if the housing 50 is a structure including six surfaces, which are a front plate, a back plate, a right side plate, a left side plate, a top plate, and a bottom plate, the first speaker unit 10 is attached to the front plate of the housing 50. Additionally, when the above-described second speaker unit 20 is mounted in the housing 50, the mounting can be made while the support plate 511 of the support member 51 on which the cone shaped diaphragm 1, the curved diaphragm 2, and the driver unit 3 are mounted functions also as the front plate of the housing 50.

Therefore, in any case of either speaker unit, in the cone shaped diaphragm 1 mounted in the housing 50, the large diameter side 1*b* is connected to the support plate 511 of the support member 51 forming a part of the housing 50, and in the curved diaphragm 2 mounted to the same, the other end side 2*b* is connected to the support leg 513 of the support member 51 forming a part of the housing 50.

Additionally, as a description of the open portion in this case, portions forward of the front plate forming the housing 50, specifically, the front surface, the upper surface, and the left and right side surfaces in a region from the support plate 511 of the support member 51 functioning as the front plate to the support leg 513 are opened.

This open portion is for effectively emitting sound to the outside with no muffling of the sound generated from the cone shaped diaphragm 1 and the curved diaphragm 2.

With the electric signal inputted to the driver unit 3, the speaker 100 formed as described above can be a hybrid type speaker system that has, comparing with a conventional speaker system for hard-of-hearing people and hearing people, higher performance, and also, lighter weight, less disposing area, and further improved versatility of the speaker, and that allows both the hard-of-hearing people and hearing people to hear sufficiently.

Note that, the electric signal inputted to the driver unit 3 may include, for example, a sound signal outputted from a television, a radio, an audio player, a personal computer, a smart device such as a smartphone and a tablet, and so on.

Additionally, although it is not illustrated, a back plate portion of the housing 50 is provided with a hole for mounting an audio jack and a switch.

Therefore, in the present invention, it is possible to enable the reproduction of sound of a wide band (sound wave for hard-of-hearing people and hearing people) by mixing the sound from the dynamic type first speaker including the cone shaped diaphragm and the sound from the second speaker including the curved diaphragm. Additionally, since the driver unit that drives the cone shaped diaphragm and the driver unit that drives the curved diaphragm are common, the manufacturing cost and the weight are reduced. Moreover, with the first speaker and the second speaker integrally provided in a coupled manner, the disposing area can be less and a compact form can be achieved.

REFERENCE SIGNS LIST

1 first diaphragm (cone shaped diaphragm)
1*a* small diameter side
1*b* large diameter side
2 second diaphragm (curved diaphragm)
2*a* one end side
2*b* other end side
3 driver unit
4 center cap (dust cap)
5 sub cone
9 cone support frame
10 speaker unit
21, 22, 23 reinforcing plate
31 voice coil
32 magnetic circuits
41 notches
50 housing
51 support member
100 speakers (hybrid type speaker system)
511 support plate (front plate)
512 protrusion portion
513 support leg

The invention claimed is:

1. A speaker unit, comprising:
a first diaphragm in a cone shape;
a second diaphragm having one end side, another end side, and side edge portions to provide the second diaphragm with a sheet shape having a width defined between the side edge portions that extends along a direction from the one end side towards said another end side, the second diaphragm including a single rounded surface portion that is curved between the one end side said another end side; and
a driver unit that drives the first diaphragm and the second diaphragm together, wherein
the driver unit is connected to a small diameter side of the first diaphragm and one end side of the second diaphragm.

2. A speaker unit, comprising:
a first diaphragm in a cone shape;
a second diaphragm in a curved sheet shape;
a driver unit that drives the first diaphragm and the second diaphragm together; and
a support member on which the first diaphragm, the second diaphragm, and the driver unit are mounted, wherein
the support member includes a support plate in a flat plate shape, a protrusion portion that protrudes from one surface of the support plate, and a support leg in a wide-width eave shape that is provided on the protrusion portion,
a small diameter side of the first diaphragm and one end side of the second diaphragm are connected to the driver unit,
a large diameter side of the first diaphragm is connected to the support plate of the support member, and
the other end side of the second diaphragm is connected to the support leg of the support member.

3. A speaker unit comprising:
a first diaphragm in a cone shape;
a second diaphragm in a sheet shape that includes a single rounded surface portion that is curved; and
a driver unit that drives the first diaphragm and the second diaphragm together, wherein
the driver unit is connected to a small diameter side of the first diaphragm and one end side of the second diaphragm, and
in the second diaphragm, the one end side is connected to a notch provided in a tip end of a coil bobbin of the driver unit.

4. The speaker unit according to claim 1, wherein
in the second diaphragm, the one end side is connected to a center cap attached to a tip end of a coil bobbin of the driver unit.

5. A speaker unit comprising:
a first diaphragm in a cone shape;
a second diaphragm in a sheet shape that includes a single rounded surface portion that is curved; and
a driver unit that drives the first diaphragm and the second diaphragm together, wherein
the driver unit is connected to a small diameter side of the first diaphragm and one end side of the second diaphragm,
in the second diaphragm, the one end side is connected to a center cap attached to a tip end of a coil bobbin of the driver unit, and
in the second diaphragm, the one end side is connected to a notch provided in the center cap.

6. The speaker unit according to claim 1, wherein
in the second diaphragm, the one end side is connected to a sub cone attached to a tip end of a coil bobbin of the driver unit.

7. The speaker unit according to claim 1, wherein
in the second diaphragm, a reinforcing plate is attached to one surface of the one end side.

8. The speaker unit according to claim 7, wherein
in the second diaphragm, the one end side is further connected to the first diaphragm via a side edge portion of the reinforcing plate.

9. The speaker unit according to claim 1, wherein
the second diaphragm includes a constricted portion or a notch portion.

10. A speaker, at least comprising:
a first diaphragm in a cone shape;
a second diaphragm in a curved sheet shape;
a driver unit that drives the first diaphragm and the second diaphragm together; and a housing that stores the first diaphragm, the second diaphragm, and the driver unit, wherein the housing includes a support member on which the first diaphragm, the second diaphragm, and the driver unit are mounted, the support member includes a support plate in a flat plate shape, a protrusion portion that protrudes from one surface of the support plate, and a support leg in a wide-width eave shape that is provided on the protrusion portion, a small diameter side of the first diaphragm and one end side of the second diaphragm are connected to the driver unit, a large diameter side of the first diaphragm is connected to the support plate of the support member forming a part of the housing, and the other end side of the second diaphragm is connected to the support leg of the support member forming a part of the housing.

11. The speaker according to claim 10, wherein the protrusion portion is provided in a vertical direction in a width direction-center portion of the support plate.

12. The speaker according to claim 11, wherein in the protrusion portion, a protruding front surface is in an arc shape equal to the curve of the second diaphragm.

13. The speaker according to claim 11, wherein the protrusion portion includes a clearance on a back surface that is not put in contact with the large diameter side of the first diaphragm.

14. The speaker according to claim 10, wherein the housing is a hollow structure in a box shape including six surfaces, which are a front plate, a back plate, a right side plate, a left side plate, a top plate, and a bottom plate, and the front plate is the support plate of the support member.

15. The speaker according to claim 14, wherein the housing is a skeleton structure in which a frontward region of the front plate includes an open portion formed by a frame body.

16. The speaker unit according to claim 2, wherein in the second diaphragm, the one end side is connected to a notch provided in a tip end of a coil bobbin of the driver unit.

17. The speaker unit according to claim 2, wherein in the second diaphragm, the one end side is connected to a center cap attached to a tip end of a coil bobbin of the driver unit.

18. The speaker unit according to claim 17, wherein in the second diaphragm, the one end side is connected to a notch provided in the center cap.

19. The speaker unit according to claim 2, wherein in the second diaphragm, the one end side is connected to a sub cone attached to a tip end of a coil bobbin of the driver unit.

20. The speaker unit according to claim 2, wherein in the second diaphragm, a reinforcing plate is attached to one surface of the one end side.

* * * * *